July 11, 1961 G. W. FLOYD 2,992,340

AMPLITUDE DISCRIMINATING SYSTEM

Filed Dec. 21, 1956

INVENTOR.
George W. Floyd,
BY
Edwin A. Oser
AGENT.

2,992,340

AMPLITUDE DISCRIMINATING SYSTEM

George W. Floyd, Los Angeles, Calif., assignor to Hughes Aircraft Company, Culver City, Calif., a corporation of Delaware Filed Dec. 21, 1956, Ser. No. 629,911

9 Claims. (Cl. 307—88.5)

Figure 1:
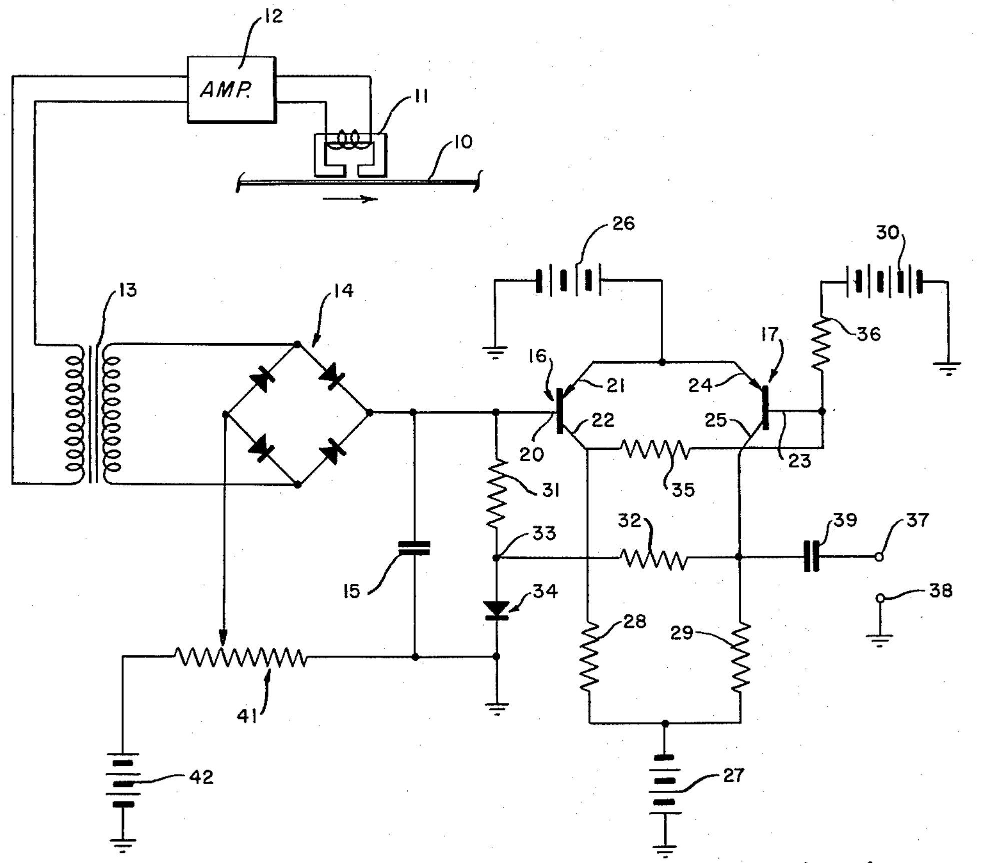

The present invention relates to amplitude discriminating systems and more particularly to an amplitude or voltage discriminator utilizing a monostable circuit.

Amplitude discriminators have been used in the past for providing an output signal representative of the desired signal derived from magnetic tapes or magnetic drums having stored intelligence. Since the amplitude of the desired signal derived by the magnetic head is oftentimes only slightly greater than the amplitude of the background noise, an accurate amplitude discriminator is required to derive the correct intelligence in the presence of noise.

In addition to the requirement of being able to differentiate between the noise and intelligence of the signal it is often necessary that the discriminating system does not cause excessive loading of the signal source. Many prior art amplitude discriminators load the signal source to an extent such that oscillations may occur.

One circuit used in the prior art to provide amplitude discrimination is the Schmitt trigger circuit. This bistable circuit, however, has a disadvantage in that the loading of the signal source changes, when the circuit triggers, in such a manner that there is a tendency for the circuit to trigger back to its previous state.

It is therefore an object of the present invention to provide an improved amplitude discriminating system.

A further object of the present invention is to provide an amplitude or voltage discriminator which reduces the loading of the source when the circuit triggers.

Another object of the present invention is to provide an amplitude or voltage discriminator utilizing a monostable circuit and including semiconductor amplifiers as the active elements.

In accordance with the present invention the output signal derived from a magnetic head may be amplified and then applied to the input circuit of a full-wave rectifier. The output signal from the full-wave rectifier is applied to the control electrode of the normally conducting semiconductor amplifier in a monostable circuit. The rectifier circuit is coupled with the bias network of the monostable circuit in such a manner that the level at which rectification will begin can be adjusted to provide selectivity of the amplitude at which discrimination takes place.

When the input signal to the rectifier plus the direct current (D.C.) bias applied to the rectifier is not sufficient to overcome the forward bias applied to the conducting semiconductor amplifier, such as a transistor, there will be no change of state of the monostable circuit.

When the output signal from the rectifier is large enough to overcome the forward bias applied to the first transistor, that transistor is rendered nonconductive. By means of a cross-coupling or voltage divider network the second transistor is then rendered conductive and the circuit remains in this condition as long as the amplitude of the signal from the rectifier is sufficient to maintain the first transistor nonconductive. Since the electrodes of the second transistor will vary in potential in accordance with the changes in the state of conduction of that transistor, an output signal may be derived which is representative of the amplitude of the input signal.

The control electrode of the first transistor is coupled to a point which is clamped to a fixed reference potential by means of a diode clamp. In this manner the loading of the signal source is reduced when the monostable circuit changes from its first state of stable conductivity to its second state.

The novel features that are considered characteristic of this invention are set forth with particularity in the appended claims. The invention itself, however, both as to its organization and method of operation, as well as additional objects and advantages thereof, will be best understood from the following description when read in connection with the accompanying drawing in which, FIG. 1 is a circuit diagram of a preferred embodiment of the present invention, and, FIG. 2 is a graphical representation of the voltages at various points in the circuit of FIG. 1 at two separate time intervals.

Figure 2:
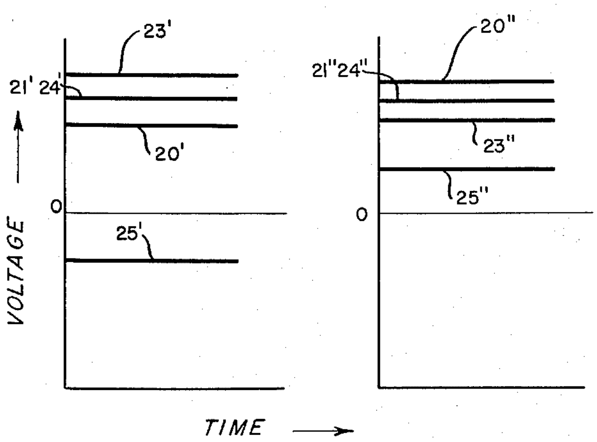

Referring now to the drawing and in particular to FIG. 1, there is shown a magnetic tape 10 containing stored signal information which may be picked up by a magnetic head schematically indicated at 11 and impressed on an amplifier 12. It is to be understood however, that although a magnetic tape is shown for purpose of illustration, a land and groove counter system for modulating a carrier signal applied to the magnetic head could be used to provide a signal for the amplifier 12. The output signal from the amplifier 12 may be applied to an input rectifier circuit 14, which may be a full-wave rectifier, through a transformer 13. The rectifier circuit 14 may include four diodes connected in a conventional bridge circuit to provide full-wave rectification of input signals applied thereto. The input signals to the rectifier are applied at opposite points of the bridge and the output signals are derived from the other pair of opposite points. To this end one of the output points of the rectifier circuit 14 is coupled to the control electrode of a first transistor 16 in a monostable circuit, and the other to a variable voltage source such as the rheostat 41. This will be more fully explained later. A filtering capacitor 15 may be connected across the output at the rectifier circuit 14 to smooth output signals therefrom. It is of course evident that if the signal source is a direct-current source, the transformer-rectifier arrangement would not be needed.

The monostable circuit includes first and second transistors 16 and 17, shown for purposes of illustration as PNP junction transistors by the accepted symbol, with the first transistor 16 having a base electrode 20, an emitter electrode 21 and a collector electrode 22. The second transistor 17 likewise has a base electrode 23, an emitter electrode 24 and a collector electrode 25. The two emitters 21 and 24 are joined at a common point and are maintained at the same positive potential by suitable bias means, shown for purposes of illustration as a first D.C. voltage source 26 having a negative terminal connected to ground and a positive terminal connected to the emitter electrodes. The collector 22 is coupled through an impedance element, shown for purposes of illustration as a resistor 28, to the negative terminal of a second voltage source illustrated as a battery 27 having a positive terminal connected to ground. The collector 25 is likewise connected to the negative terminal of the second voltage source 27 through an impedance element such as a resistor 29. The base 20 is connected to the rectifier circuit 14 and is also coupled to the collector 25 through a first voltage divider network including dropping resistors 31 and 32 connected in series. The common point 33 between the dropping resistors 31 and 32 is clamped to signal ground by a unidirectional current conductive device such as a diode 34 having its cathode connected to signal ground and its anode connected to the junction point 33. The collector 22 of the first transistor 16 is coupled to the base 23 of the second transistor 17 through a coupling resistor 35. The base 23 is coupled through a dropping resistor 36 to the positive terminal of a third source of potential 30 which has its negative terminal connected to signal ground.

Output signals from the circuit may be derived from the collector 25 of the second transistor 17, and to this end a first signal output terminal 37 is coupled to the collector electrode 25. A second output terminal 38 is connected to signal ground. In order that the instantaneous absolute value of the voltage at the collector 25 will not affect the output signal, the terminal 37 may be coupled to the collector electrode 25 through a capacitor 39.

To provide a selective control of the level at which rectification will take place in the rectifier circuit 14, the potentiometer 41 may be included. The potentiometer 41 may be connected between signal ground and the positive terminal of a fourth voltage source 42 which has a negative terminal connected to signal ground. The variable tap of the potentiometer is then connected to the rectifier circuit in a manner which is well known.

When there is no input signal from the magnetic head 11 the first transistor 16 is forward biased since the emitter 21 is at a potential which is positive with respect to the base 20. This is evident since the emitter 21 is connected directly to the positive terminal of the voltage source 26 and the base 20 is coupled to the negative terminal of the second voltage source 27 through the dropping resistor 29 connected in series with the voltage divider network including the resistors 31 and 32. The voltage sources 27 and 30 in conjunction with the resistive network including the base resistor 36, the coupling resistor 35, and the dropping resistor 28, serve to maintain the base 23 of the second transistor at a potential which is positive with respect to that of the emitter 24. The potential drop across the resistor 31 caused by the base current flow through the resistors 31, 32, and 29 thus maintains the junction point 33 at a potential which is not positive with respect to ground.

The various potentials which exist in the circuit under the conditions when the first transistor 16 is conductive and the second transistor 17 is nonconductive are illustrated by the left-hand portion of the graph of FIG. 2 wherein voltage is plotted along the ordinate and time along the abscissa. The primed reference characters indicate the potentials at the corresponding points indicated by like un-primed reference characters in FIG. 1. The reference voltage designated zero in the graph indicates signal ground. It is thus seen that in the stable condition of the monostable circuit of FIG. 1 the collector potential 25′ is negative with respect to signal ground, the base 20′ is positive but more negative than the emitter potentials 21′ and 24′ and the base potential 23′ is positive with respect to the emitter potentials.

When the level of the output signal of the rectifier circuit 14, or the amplitude of a D.C. signal applied to the monostable circuit by any suitable D.C. signal source, is sufficient to make the base 20 positive with respect to the emitter potential the first transistor 16 will be rendered nonconductive. There is then no current flow from the emitter electrode 21 to the collector electrode 22 and the collector 22 tends to become negative. This increases the current flow through the base resistor 36 and coupling resistor 35 driving the base electrode 23 of the second transistor sufficiently negative with respect to the emitter 24 to render the second transistor 17 conductive. During the original stable state of the circuit the base current of the first transistor 16 flowing through the resistive network including the dropping resistors 31 and 32 served to maintain the collector electrode 25 at a certain negative potential.

When the second transistor 17 becomes conductive at a later time the conditions illustrated in the right hand portion of FIG. 2 prevail. The potentials of the various points of the circuit of FIG. 1 are indicated by like reference characters which are double primed. Thus the collector potential 25″ becomes more positive and remains at the more positive potential as long as the second transistor 17 is conductive. This will be the condition as long as the base potential 20″ of the first transistor is positive with respect to the emitter potential 21″. Since the first transistor 16 is no longer conducting, the current supplied to maintain the junction point 33 of the resistive network at a potential which is not positive with respect to ground now comes from the rectifier circuit 14. There thus tends to be a loading of the signal source. However, since the collector 25 to which the signal output terminal 37 is coupled rises in potential to the potential 25″, the current required for the diode clamp 34 is then provided from the transistor 17 through the resistor 32. This then reduces the current drain on the signal source and therefore prevents excessive loading of the signal source.

If the D.C. level of the input signal plus the D.C. bias provided by the potentiometer 41 then becomes less than the potential of the emitter 21, the first transistor 16 will again be rendered conductive. In a manner similar to that just described the collector 22 will become more positive, reducing the current flow through the coupling resistor 34 and thus causing the base electrode 23 to become more positive. This then renders the second transistor 17 nonconductive again. The circuit is then returned to the condition illustrated by the left-hand portion of the graph of FIG. 2.

It is thus seen from the graph of FIG. 2 that the output voltages 25′ and 25″ are indicative of the value of the input signal to the rectifier circuit. That is, when the level of the input signal to the rectifier plus the D.C. bias applied to the rectifier circuit is not sufficient to overcome the forward bias of the first transistor 16, the output voltage will be at one value, and when the signal is sufficient to overcome the forward bias of the first transistor 16 the output voltage will be at another value. It is of course to be understood that although a magnetic device is shown for purposes of illustration as providing the input signal to the voltage discriminator, any suitable signal source could be used.

While it is to be understood that the circuit specifications of the amplitude or voltage discriminator of the present invention may vary according to the design for any particular application, the following specifications for the circuit of the FIG. 1 are included by way of example only:

| | |
|---|---|
| Transistors 16 and 17 | General Electric Type 2N43. |
| Resistor 28 | 2000 ohms. |
| Resistor 29 | 1000 ohms. |
| Resistor 31 | 90,000 ohms. |
| Resistor 32 | 10,000 ohms. |
| Resistor 35 | 5000 ohms. |
| Resistor 36 | 27,000 ohms. |
| Capacitor 15 | 510 micro-microfarads. |
| Voltage source 26 | +6 volts. |
| Voltage source 27 | −6 volts. |
| Voltage source 30 | +30 volts. |
| Voltage source 42 | +6 volts. |

There has thus been disclosed an amplitude discriminating system which utilizes a monostable circuit and which reduces the loading of the signal source when the circuit triggers from one state to another.

What is claimed is:

1. A voltage discriminator which comprises, a signal input circuit including a source of direct-current signals, a monostable circuit including first and second transistors each having base, collector and emitter electrodes, said monostable circuit further including a pair of impedance elements connected in series between the base of said first transistor and the collector of said second transistor, a voltage clamp connected to the junction point of said impedance elements and to a point of fixed reference potential, said emitter electrodes being connected to a fixed potential bias means connected to said collector electrodes of said first and second transistors and adapted to maintain said first transistor normally conductive and said second transistor normally nonconductive when the potential of the base of said first transistor is less than a predetermined value, and full wave rectifier means interconnecting said source with the base of said first transistor whereby the states of conduction of said transistors are interchanged when the input signal provided by said source is greater than said predetermined value.

2. A voltage discriminator which comprises, a signal input circuit including a full-wave rectifier, a monostable circuit including first and second transistors, each having base, collector, and emitter electrodes, said monostable circuit further including a pair of impedance elements connected in series between the base of said first transistor and the collector of said second transistor, a voltage clamp connected to the junction point of said impedance elements and to a point of fixed reference potential, bias means including a fixed potential connected to said emitters and a variable means connected to said base and collector of said first and second transistors and adapted to maintain said first transistor normally conductive and said second transistor normally nonconductive, and means interconnecting said rectifier with the base of said first transistor whereby the states of conduction of said transistors are interchanged when the input signal applied to said rectifier is greater than a predetermined value.

3. An amplitude discriminator comprising, a full-wave rectifier adapted to receive an alternating-current signal of varying amplitude and to provide a direct-current signal, first and second transistors, each having base, collector, and emitter electrodes, the base electrode of said first transistor being coupled to said rectifier and adapted to receive signals therefrom, a first voltage divider network connected between the base of said first transistor and the collector of said second transistor and including first and second resistors connected in series, a third resistor connected between the collector of said first transistor and the base of said second transistor, a voltage clamp connected between the common point of said first and second resistors and a point of fixed reference potential, bias means including a fixed potential connected to the emitter electrodes of said first and second transistors and controlling means coupled to the base and collector electrodes of each of said transistors and adapted to maintain said first transistor normally conductive and said second transistor normally nonconductive in response to said direct-current signal having an amplitude less than a predetermined value, signal output terminals connected to the collector of said second transistor and to said point of fixed reference potential, and variable bias means coupled to said rectifier and said first transistor for providing a controllable level of rectification for said alternating-current signal.

4. A voltage discriminator comprising, first and second transistors, each having base, collector, and emitter electrodes, first bias means connected directly to each of said emitters for maintaining said emitters at a substantially constant potential, second bias means, a first impedance element connected between said second bias means and the collector of said first transistor, a second impedance element connected between said second bias means and the collector of said second transistor, a third impedance element connected between the collector of said first transistor and the base of said second transistor, third bias means, a fourth impedance element connected between the base of said second transistor and said third bias means, fifth and sixth impedance elements connected in series between the base of said first transistor and the collector of said second transistor, a diode having one electrode connected to the junction point of said fifth and sixth impedance elements and the other electrode connected to ground, a signal input circuit coupled to the base of said first transistor and a pair of signal output terminals one of which is coupled to the collector of said second transistor.

5. A voltage discriminator as defined in claim 4 wherein each of said impedance elements is a resistor.

6. A voltage discriminator comprising, first and second transistors, each having base, collector, and emitter electrodes, first bias means connected directly to each of said emitters for maintaining said emitters at a substantially constant potential, second bias means, a first impedance element connected between said second bias means and the collector of said first transistor, a second impedance element connected between said second bias means and the collector of said second transistor, a third impedance element connected between the collector of said first transistor and the base of said second transistor, third bias means, a fourth impedance element connected between the base of said second transistor and said third bias means, fifth and sixth impedance elements connected in series between the base of said first transistor and the collector of said second transistor, a diode having one electrode connected to the junction point of said fifth and sixth impedance elements and the other electrode connected to ground, full-wave rectifier coupled to the base of said first transistor and adapted to provide direct-current signals thereto, fourth variable voltage means coupled to said first transistor and to said rectifier for controlling the rectification level of said rectifier, and a pair of signal output terminals one of which is coupled to the collector of said second transistor.

7. An amplitude discriminating system comprising a signal source for providing a varying direct-current signal, a monostable circuit coupled to said source and including first and second transistors each having base, collector, and emitter electrodes, said emitter electrodes being connected to a fixed potential, means including a bias source coupled to the base and collector electrodes of said first and second transistors and including a pair of impedance elements coupled in series between the base electrode of said first transistor and the collector electrode of said second transistor, said means maintaining said first transistor conductive when said direct-current signal is less than a predetermined value and maintaining said second transistor conductive and said first transistor nonconductive when said direct-current signal is greater than said predetermined value, a voltage clamp connected from the junction point of said impedance elements to a source of reference potential, and a signal output circuit coupled to said second transistor for providing an output signal indicative of the amplitude of said varying direct-current signal in response to said direct-current signal being greater than said predetermined value and having a fixed value in response to said direct-current signal being less than said predetermined value.

8. An amplitude discriminating system comprising a rectifier adapted to receive an input alternating-current signal and to provide a direct-current signal, a monostable circuit coupled to said rectifier and including first and second transistors each having base, collector and emitter electrodes, said emitter electrodes of said monostable circuit connected to a fixed potential, means including a bias source coupled to said rectifier and to the base and collector electrodes of said first and second transistors and including first and second impedance means coupled between the base of said first transistor and the collector of said second transistor, said means maintaining said first transistor conductive when the direct-current signal from said rectifier is less than a predetermined value and maintaining said second transistor conductive and said first transistor nonconductive when the direct-current signal from said rectifier is greater than said predetermined value, a diode coupled between said first and second impedance means and a source of reference potential, and a signal output circuit coupled to said second transistor for providing an output signal representative of the amplitude of the alternating-current signal in response to said direct-current signal being greater than said predetermined value and having a fixed value in response to said direct-current signal being less than said predetermined value.

9. An amplitude discriminating system comprising a signal input circuit including a full-wave rectifier, a monostable circuit including first and second transistors, each having base, collector, and emitter electrodes, a fixed potential coupled to said emitter electrodes of said first and second transistors, bias means coupled to said base and collector electrodes of said first and second transistors and including first and second impedance elements coupled between the base of said first transistor and the collector of said second transistor, said bias means maintaining said first transistor conductive and said second transistor nonconductive when an input signal applied to said rectifier is below a predetermined value, a voltage clamp coupled from between said first and second impedance elements to a source of reference potential, and means interconnecting said rectifier with the base of said first transistor, whereby said first transistor is rendered nonconductive when the input signals applied to said rectifier are greater than said predetermined value determined by said bias means.

References Cited in the file of this patent

UNITED STATES PATENTS

| | | |
|---|---|---|
| 2,622,212 | Anderson et al. | Dec. 16, 1952 |
| 2,762,464 | Wilcox | Sept. 11, 1956 |
| 2,776,382 | Jensen | Jan. 1, 1957 |
| 2,789,267 | Beal et al. | Apr. 16, 1957 |
| 2,809,339 | Guggi | Oct. 8, 1957 |
| 2,814,736 | Hamilton | Nov. 26, 1957 |
| 2,833,938 | Pinckaers | May 6, 1958 |
| 2,843,761 | Carlson | July 15, 1958 |
| 2,845,548 | Silliman | July 29, 1958 |
| 2,850,236 | Schaefer et al. | Sept. 2, 1958 |
| 2,850,649 | Schroeder | Sept. 2, 1958 |
| 2,866,104 | Biggam | Dec. 23, 1958 |
| 2,880,330 | Linvill et al. | Mar. 31, 1959 |